Aug. 31, 1965  J. I. ALLISON  3,203,036
POULTRY HEAD CHOPPER CONSTRUCTION
Filed Dec. 23, 1963

INVENTOR.
Jack I. Allison
BY
Frease, Bishop, Johns & Schick
ATTORNEYS

United States Patent Office 3,203,036
Patented Aug. 31, 1965

3,203,036
POULTRY HEAD CHOPPER CONSTRUCTION
Jack I. Allison, Box 133, Wilmot, Ohio
Filed Dec. 23, 1963, Ser. No. 332,605
1 Claim. (Cl. 17—12)

This invention relates to poultry head removing devices in general and more particularly to a poultry head chopper which incorporates features both for the protection of the user and the protection of the device itself.

It is standard practice in the poultry industry and in the home or butcher shop or other location where a chicken or other poultry is to be prepared for eating to kill the same by removing its head prior to dressing the same for cooking. It is desirable that the device used to behead the poultry be sanitary and therefore be capable of being easily cleaned. It is likewise desirable to accomplish the killing in as humane a manner as possible.

The usual method of accomplishing this end is to remove the poultry's head with a cleaver or other heavy bladed instrument. This method has certain obvious disadvantages. For example, the chicken must be held while alive with one hand while the other hand of the operator is used to swing or chop with the cleaver. It is frequently difficult to hold a live animal still enough to accomplish a clean removal of the head at the place desired because of the live animal's activity. Further, the operator runs the constant risk of cutting himself while attempting to remove the live animal's head.

A further disadvantage of hand chopping is that freshly killed poultry bleeds rather profusely and very likely will splatter with blood the person performing the poultry killing.

It is also normal when killing poultry to merely place or hold the poultry with its head or neck on a cutting board or the like. This presents a disadvantage in that the blade of the cutting instrument will soon become dull after repeated hard impact with the cutting board necessary to accomplish clean head removal.

Prior devices have been constructed to accomplish poultry head removal. However, these devices also have inherent in their construction certain of the disadvantages mentioned above. For instance, the cutting blade of such instruments in general have impact with a cutting board or other poultry supporting surface which quickly results in a dull blade. While a cleaver or the like may be fairly easily sharpened, a blade mounted in a cutting device must be removed from the device necessitating the disassembly of the device.

Furthermore, such devices frequently consist merely of a vertically sliding blade or a hinged cleaver-type construction. These blades can be very dangerous to the operator of the device since the blade is open and exposed during those periods when the device is not in use.

It is, therefore, a general object of the present invention to provide a poultry head chopping device which is safe to use, humane to the animal being killed and which can be easily kept clean and sanitary.

It is a further object of the present invention to provide a poultry head chopping device which may easily be operated by a single person without risking the danger of cutting himself while operating the device.

It is still a further object of the present invention to provide a poultry head chopping device in which the blade will remain sharp even after repeated use.

It is also an object of the present invention to provide a poultry head chopping device which incorporates a screen or shield to prevent the operator from becoming splattered with blood from the decapitated poultry.

It is still another object of the present invention to provide a poultry head chopping device which includes a positive lock arrangement to prevent motion of the cutting blade when the cutting device is not in use.

Finally, it is an object of the present invention to provide a poultry head chopping device wihch incorporates the foregoing desiderata, which may be easily manufactured, which satisfactorily solves the problems and avoids the difficulties which have existed in the art, and which obtains the foregoing advantages and results in an effective, simple and inexpensive manner.

These and other objects and advantages apparent to those skilled in the art from the following description and claims may be obtained, the stated results achieved and the described difficulties overcome by the improvements, combinations, constructions and elements which comprise the present invention, the nature of which is set forth in the following general statement, a preferred embodiment of which—illustrative to the best mode in which applicant has contemplated applying the principles —are set forth in the following description and drawing and which are particularly and distinctly pointed out and set forth in the appended claims forming a part hereof.

The nature of the discoveries and improvements in poultry head chopper construction of the present invention may be stated in general terms as including a base member, a pair of grooved upright blade guide members, a top guide member, a cutting blade extending between the upright guide members and slidably mounted in the grooves, a pair of blade guard members mounted between the upright blade guide members and located near the top of the upright guide members and the top guide member, a rod extending upward and mounted on the upper side of the blade and extending upward from the blade through the guard member and through the top guide member and having handle or grip means attached to its upper end, a pair of poultry rest members having a neck-receiving groove formed therein mounted at the bottom of the upright guide members, a pair of stop members mounted on the base, one at each end of the neck-receiving members between the neck-receiving members and the base member thereby providing a space between the neck-receiving member and the base member and adapted to engage each bottom end portion of the blade when the blade is in lowered position, a neck-confining strap mounted on one of the neck groove receiving members extending from one side of the groove to the other side of the groove and removably engageable with a fastening member mounted on the other side of the neck groove, and a screen member attached at the upper end of the device adapted to be raised to an open position or lowered to a position covering the head portion of a fowl.

By way of example, the improved poultry head chopping device of the present invention is illustrated in the accompanying drawing forming a part hereof in which.

Similar numerals refer to similar parts throughout the various figures of the drawing.

Figure 1:
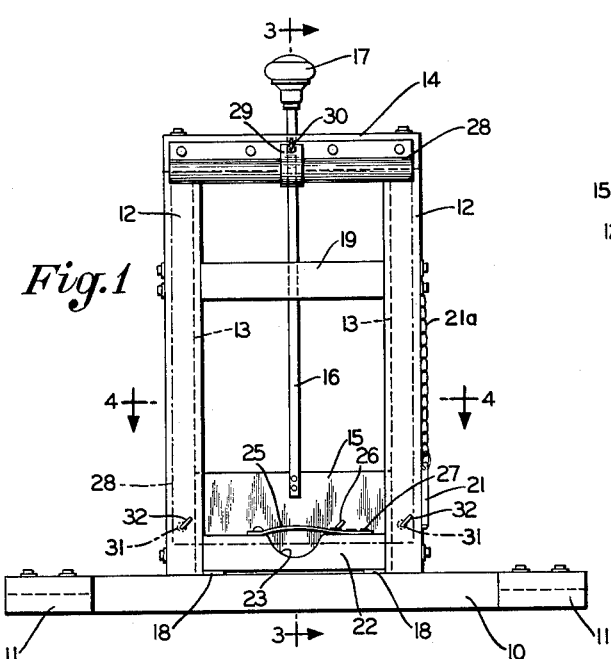
FIGURE 1 is a front elevation showing the improved poultry head chopping device with the blade in the lowered position.

The improved poultry head chopping device of the present invention, as shown in FIG. 1, includes a base member 10, and a pair of lateral base members 11, provided at the ends of the base member 10 to lend stability to the device so that it may conveniently be supported on any flat surface such as a table or the like. Any suitable base member may be used as a part of the device.

Securely attached to and extending upward from the base member 10 are a pair of blade guide members 12, each having a groove 13 formed vertically on the inner surface of the guide members. A top handle guide member 14 is mounted on and extends between the upper ends of the upright guide members 12. A cutting blade 15 is slidably mounted in the groove 13 and extends between the two upright guide members 12. Cutting blade 15 may slide vertically from the top to the bottom of guide members 12 in grooves 13. Cutting blade 15 is sharpened in any conventional manner along most of its bottom edge.

A handle rod 16 is mounted at the center of the top edge of the blade and extends upward from the blade through a hole formed in the top guide member 14. A handle 17 is attached to the upper end of the rod 16. Although the handle 17 illustrated in the drawings is of the knob-type, it is to be understood that any suitable handle means may be mounted and used in accordance with the present invention.

A pair of blade stops 18 are mounted on the base member 10 adjacent the guide members 12. The purpose of the blade stops will be discussed more in detail below.

According to the present invention, a pair of blade guards 19 are mounted near the top of the upright guide members 12. A slot is thereby provided between the two guard members 19 through which the blade 15 may travel when sliding in the grooves 13. These guard members 19 are spaced below top guide members 14 so that when the blade is held in the raised position, its lower edge will be located between the two guard members 19, thereby covering the cutting edge of the blade.

Figure 2:
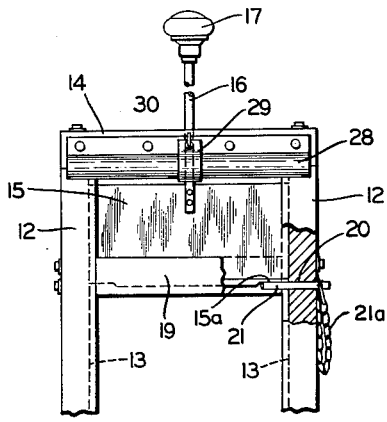
FIG. 2 is a fragmentary front elevation, partly in section, of the top portion of the improved poultry head chopping device showing the blade in raised position.
Figure 3:
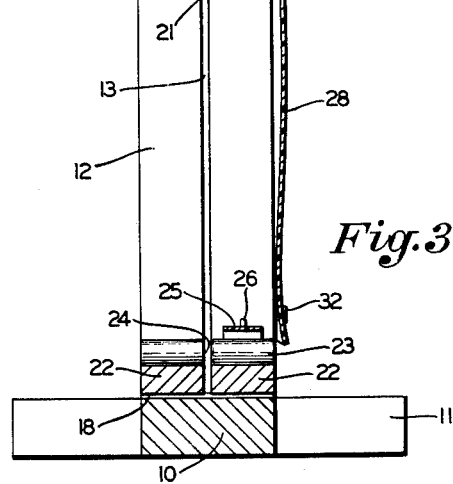
FIG. 3 is a cross sectional view on an enlarged scale taken along the lines 3—3 of FIG. 1.

As is best seen in FIG. 2 and 3, a hole 20 is formed through one of the guide members 12 at a point just above the bottom side of the blade guards 19. The hole 20 is adapted to receive a blade locking pin 21 which pin is longer than the width of the upright guide member 12. Thus, the blade 15 may be raised with its lower end between the guard members 19 and held in a raised position by inserting the locking pin 21 through the hole 20 to engage a portion of the lower edge of the blade while in its raised position. A positive stop is thus provided whereby the blade cannot be lowered without first removing the locking pin 21.

The space between the top of the guards 19 is shorter than the vertical height of the blade so that when the blade is raised and the locking pin is inserted in the locking pin hole, the blade cannot be raised above the top of guards 19. Thus, when the blade is raised and the locking pin inserted, it will be impossible to expose the cutting edge of the blade.

So that the locking pin 21 will not be lost when removed from the locking pin hole, a chain or other tie device 21a may be mounted at one end of the pin, the other end being attached to the device at some suitable and convenient position.

Figure 4:
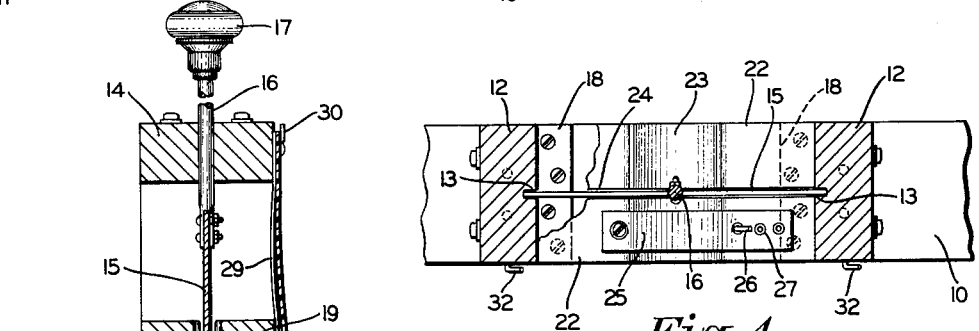
FIG. 4 is a fragmentary cross sectional view on an enlarged scale taken along the lines 4—4 of FIG. 1.
Figure 5:
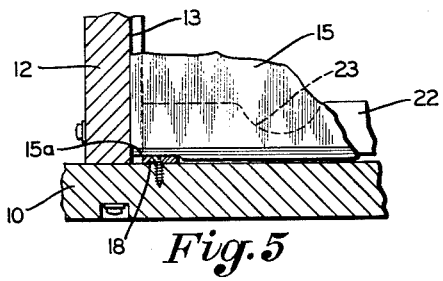
FIG. 5 is a fragmentary sectional view on an enlarged scale of the area of the junction between one of the upright members and the base member.

Referring specifically to FIGS. 4 and 5, the pair of blade stops 18 are mounted on the top surface of the base member 10 adjacent the inside surface of the upright guide members 12. Stop members 18 may be formed of any suitable material or shape. However, they are preferably constructed of strips of steel or other strong hard material. The stop members 18 provide an abutting surface for the bottom outside edge of the blade 15. As can clearly be seen in FIG. 5, a small portion 15a on each end of the bottom edge of the blade 15 may be ground flat, the remainder of the bottom edge of the blade 15 as mentioned above being ground sharp to provide the cutting edge. The thickness of the stop 18 is great enough, so that when the blade is lowered and the portion 15a of the blade 15 abuts the top surface of stop 18, the bottom edge of the blade 15 will not come in contact with or impact base member 10. The blade 15 will, therefore, not become dull from repeated impact with the base 10. Likewise, the base member will not become damaged from the use of the blade.

A pair of poultry support member 22 is mounted at the bottom end of and which extend between the upright guide members 12 and rest on the top surface of the blade stop members 18. A groove 23 is formed at the top central portion of the support members 22 which is adapted to receive the neck of the animal to be killed. Since the support members 22 are mounted on stop members 18, a space is provide between the bottom surface of the support members 22 and the top surface of the base member 10. The device may then be easily cleaned merely by directing a stream of water in this area.

The pair of poultry support members 22 are spaced a short distance apart from one another to provide a slot 24 through which the blade travels when in operation. A flexible neck-confining band 25 is attached at one end to the poultry support member 22 between one edge of the neck groove 23 and the upright member 12. A suitable removable fastening device 26 is mounted on the top surface of the support member 22 between the other edge of the groove 23 and the other upright member 12. The flexible band 25 preferably is provided with a plurality of members adapted to be removably engaged with the fastening device 26.

According to the preferred embodiment of the present invention, the removable engaging members 27 may consist of a series of holes formed through one end of the flexible band 25. The fastening device may consist of a hook-like member whereby one hole in the neck band may be slipped over the hook-like member to attach the other end of the band to the poultry support member 22. The poultry may then be held in the device prior to killing by placing its neck in the groove 23 and fastening the band 25 to the fastening device 26.

Referring specifically to FIGS. 1 and 3, a screen 28 is mounted adjacent the top of the guide members 12. Screen 28 is preferably constructed of a flexible waterproof material such as plastic or polyethylene. The screen 28 may be rolled up as shown in the solid lines in FIG. 1 or the screen may be lowered to cover the head and neck portion of the animal confined in the device, as shown in the dot-dash lines in FIG. 1 and in solid lines in FIG. 3. This assembly is preferably also provided with a belt or strap 29 having a hole at one end and which is attached to the top guide 14 at the other end. The screen may then be held in the rolled-up position by slipping the hole in strap 29 over a hook 30 during those periods when it is not in use.

The screen is also provided with a pair of holes 31 at the bottom corners which are adapted to engage and slip over hook members 32. The screen may thereby be removably held in the lowered position while covering the head and neck of the animal during decapitation.

The various members of the device may be constructed of any suitable or convenient material. However, it is preferable from the standpoint of cost and durability to construct the base, the upright members and top guide members, the guard members and neck-receiving members of wood. Similarly, from the standpoint of providing the necessary strength, the lock pin 21 is preferably constructed of metal.

Also, it is desirable from the standpoint of durability to connect the various members together in as strong a manner as possible. For this purpose, heavy duty screws are illustrated in the drawing. However, it is to be understood that the various parts may be fastened together by any suitable or convenient fastening means.

Accordingly, the poultry head chopper construction of the present invention provides a device which is safe and easy to operate; which may be easily cleaned after use; which prevents the splattering of blood onto the operator of the device; which may be rendered safe when not in use; which is strong and durable and requires little or no maintenance and which overcomes many of the disadvantages and failings of prior methods and devices.

In the foregoing description, certain terms have been used for brevity, clearness and understanding; but no unnecessary limitations are to be implied therefrom beyond the requirements of the prior art, because such terms are used for descriptive purposes only and are not for purposes of limitation, and are intended to be broadly construed.

Moreover, the embodiments of the present improved construction illustrated and described and the examples given are by way of example, and the scope of the present invention is not limited to the exact details of construction of the various parts.

Having now described the features, discoveries and principles of the invention, the manufacture and assembly of the preferred embodiment thereof, the advantageous new and useful results obtained thereby, the new and useful improvements, constructions and elements obvious to those skilled in the art are set forth in the appended claim.

I claim:

Poultry head chopper construction including a base member, a pair of grooved upright members providing guide means extending from the top to the bottom thereof mounted on the base member, a top member mounted on the upright members and extending between the upright members; the base, upright members and top members forming a frame, a vertically disposed blade having a cutting edge mounted in the frame slidable from the base to the top member in the guide means, handle means attached to the blade for sliding the blade in the guide means between lowered and raised positions, guard means mounted between said upright members and spaced from the top member, said guard means being located at a position to cover the cutting edge of the blade when the blade is in the raised position, blade stop means mounted on the base positioned to prevent the cutting edge from contacting the base when the blade is in the lowered position, a blade locking pin for positively locking the blade in the raised position, poultry neck-receiving means mounted on the base having a vertical blade travel space formed therein and flexible means cooperating with the poultry neck-receiving means to surround and confine the neck of poultry to the poultry neck-receiving means.

References Cited by the Examiner

UNITED STATES PATENTS

| | | | |
|---|---|---|---|
| 1,149,517 | 8/15 | Hogan | 17—12 |
| 1,215,296 | 2/17 | Matthews | 146—159 |
| 1,389,784 | 9/21 | Rece et al. | 17—12 |
| 1,474,711 | 11/23 | Haas | 17—12 |

SAMUEL KOREN, *Primary Examiner.*

LUCIE H. LAUDENSLAGER, *Examiner.*